United States Patent
Kobayashi et al.

[11] Patent Number: 5,979,303
[45] Date of Patent: Nov. 9, 1999

[54] FRYER

[75] Inventors: Toshihiro Kobayashi; Daisuke Kato, both of Nagoya, Japan

[73] Assignee: Paloma Industries, Limited, Aichi-Ken, Japan

[21] Appl. No.: 09/217,166

[22] Filed: Dec. 21, 1998

[30] Foreign Application Priority Data

Jan. 16, 1998 [JP] Japan .................................. 10-020502

[51] Int. Cl.$^6$ ............................ A47J 27/00; A47J 37/00; A47J 37/12
[52] U.S. Cl. ............................ 99/403; 99/330; 126/391; 126/375
[58] Field of Search ............................ 99/330, 336, 331, 99/403, 407–410; 126/390, 391, 374, 375, 350 R, 360 R; 210/167, DIG. 8; 426/417, 438, 523; 431/328, 329, 326, 18; 219/441, 440, 442, 492; 428/422, 428

[56] References Cited

U.S. PATENT DOCUMENTS

| | | | |
|---|---|---|---|
| 2,827,379 | 3/1958 | Phelan | 99/403 |
| 3,938,948 | 2/1976 | Moore et al. | 99/403 X |
| 4,397,299 | 8/1983 | Taylor et al. | 126/391 |
| 4,947,824 | 8/1990 | Ejiri et al. | 431/1 X |
| 5,038,753 | 8/1991 | Yokoyama et al. | 126/391 |
| 5,209,218 | 5/1993 | Daneshvar et al. | 99/403 X |
| 5,253,566 | 10/1993 | McCabe et al. | 99/330 X |
| 5,261,322 | 11/1993 | Yokoyama et al. | 99/331 X |
| 5,297,474 | 3/1994 | Tabuchi | 99/344 |
| 5,546,851 | 8/1996 | Goto | 99/446 |

*Primary Examiner*—Timothy F. Simone
*Attorney, Agent, or Firm*—Pearson & Pearson

[57] ABSTRACT

When an inclined surface (10*a*) of an oil tank 10 is heated by a burner (31), the temperature of the oil rises near the inclined surface (10*a*). Then, all the heated high-temperature oil flows out from an outlet port (16) in an upper portion of a guide plate (14) directly to the cooking zone. Thus, the oil temperature is rapidly raised in the cooking zone. The oil temperature in an intermediate zone under the cooking zone is more difficult to rise than that in the cooking zone. The deterioration of the oil can be therefore suppressed.

3 Claims, 4 Drawing Sheets

FRYER

BACKGROUND OF THE INVENTION

1. Field of the Invention

The present invention relates to a fryer mainly for business use, for heating cooking oil filling an oil tank.

2. Description of the Related Art

As a device for frying food such as fried potatoes, a fryer for business use has been heretofore used in which an outer wall of an oil tank is directly heated by a burner so as to increase a temperature of cooking oil (hereinafter, simply referred to as oil) in the oil tank. Such a fryer has a constitution as described below. For example, as shown in FIG. 5, an inclined surface 10a is formed on a side surface of an oil tank 10. The inclined surface 10a is inclined toward a bottom and the outer wall thereof is heated by a burner 31. A net 11 for placing a basket containing the food is disposed over this inclined surface 10a. Thereby, a cooking zone for frying is provided in an upper portion of the oil tank 10. In such a constitution, when the outer wall of the inclined surface 10a is heated by the burner 31, the temperature of the oil rises near the inclined surface 10a. Thus, the oil is convected in an intermediate zone provided at a heating position under the cooking zone. As a result, the temperature of the oil also gradually rises in the cooking zone in which the food is located. Meanwhile, the side surface of the oil tank 10 includes a vertical surface and the inclined surface 10a alone toward the bottom. Fry residues, which fall away from the food during the cooking and remain in the oil after the cooking, thus sink into a cold zone under the heating position in which a heat is difficult to transfer. The fry residues are therefore prevented from being carbonized. The contamination and deterioration of the oil are consequently suppressed.

In this fryer, the cooking zone is widely formed so that large quantities of food can be cooked at a time. Thus, the oil is heated in a lower portion of the cooking zone. Desirably, the shortest time possible is required for raising the oil temperature to a suitable temperature after the start of heating operation or the introduction of frozen food or the like. However, the raising of the oil temperature in the cooking zone to the suitable temperature requires the raising of the oil temperature in the intermediate zone as well. Thus, the rise in the temperature takes a longer time due to a great deal of oil. Moreover, the oil is disadvantageously prone to deteriorate because a great deal of oil also including the oil in the intermediate zone is heated to a high temperature.

SUMMARY OF THE INVENTION

A fryer of claim 1 of the present invention for solving the above problems comprises:

an oil tank having an inclined surface inclined downward toward the deepest portion, the oil tank being filled with cooking oil; and heating means for heating the inclined surface from the outside of the oil tank, the fryer for supporting and frying food in a cooking zone over the inclined surface in the oil tank, wherein the oil tank includes a guide plate for guiding the cooking oil heated on the inclined surface directly to the cooking zone and guiding the cooking oil in a lower portion of the oil tank to the inclined surface, along the inclined surface.

According to the fryer of claim 2 of the present invention for solving the above problems, in the fryer of claim 1, a receiving box for storing fry residues falling from the food is included in the lower portion of the oil tank, and the receiving box is attachable and removable to/from the oil tank.

According to the fryer of claim 3 of the present invention for solving the above problems, in the fryer of claim 2, the guide plate is attachable and removable, and the receiving box is integrated with the guide plate.

The fryer of claim 1 of the present invention having the above-described constitution heats the inclined surface of the oil tank from the outside, and it supports and fries the food in the cooking zone over the inclined surface in the oil tank. Furthermore, the fryer includes the guide plate for guiding the cooking oil heated on the inclined surface directly to the cooking zone and guiding the cooking oil in the lower portion of the oil tank to the inclined surface, along the inclined surface. Accordingly, the cooking oil heated on the inclined surface to a high temperature is guided directly to the cooking zone. It is therefore possible to intensively increase the temperature of the cooking oil in the cooking zone associated with the cooking of the food.

Furthermore, in the fryer of claim 2 of the present invention having the above-described constitution, the receiving box for storing the fry residues falling from the food is included in the lower portion of the oil tank. This receiving box is attachable and removable to/from the oil tank. Thus, when a large amount of fry residues are stored in the receiving box, the receiving box can be removed so as to remove the fry residues.

Furthermore, in the fryer of claim 3 of the present invention having the above-described constitution, the guide plate is attachable and removable, and the receiving box is integrated with the guide plate. Thus, the guide plate and the receiving box can be removed together at a time.

DETAILED DESCRIPTION OF THE PREFERRED EMBODIMENTS

For further clarifying the constitution and effect of the present invention described above, a preferred embodiment of a fryer of the present invention will be described below.

Figure 1:
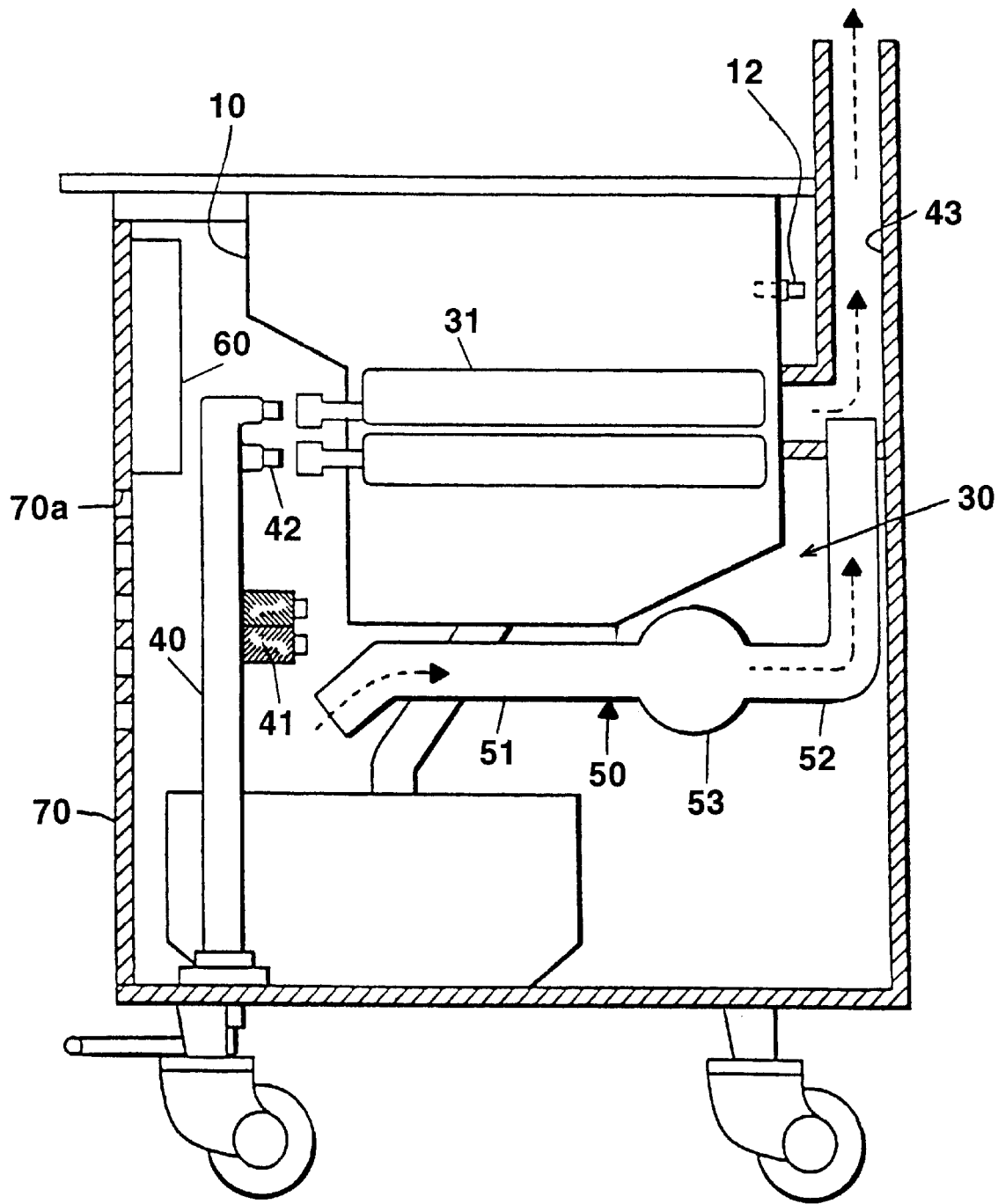
FIG. 1 is a schematic illustration of a constitution of a fryer of an embodiment.

FIG. 1 is a schematic illustration of the constitution of the fryer of an embodiment of the present invention. This fryer comprises an oil tank 10 filled with oil; a heating station 30 for providing the combustion for a burner 31 in order to heat the oil in the oil tank 10; a casing 70 for containing these; or the like.

Figure 2:
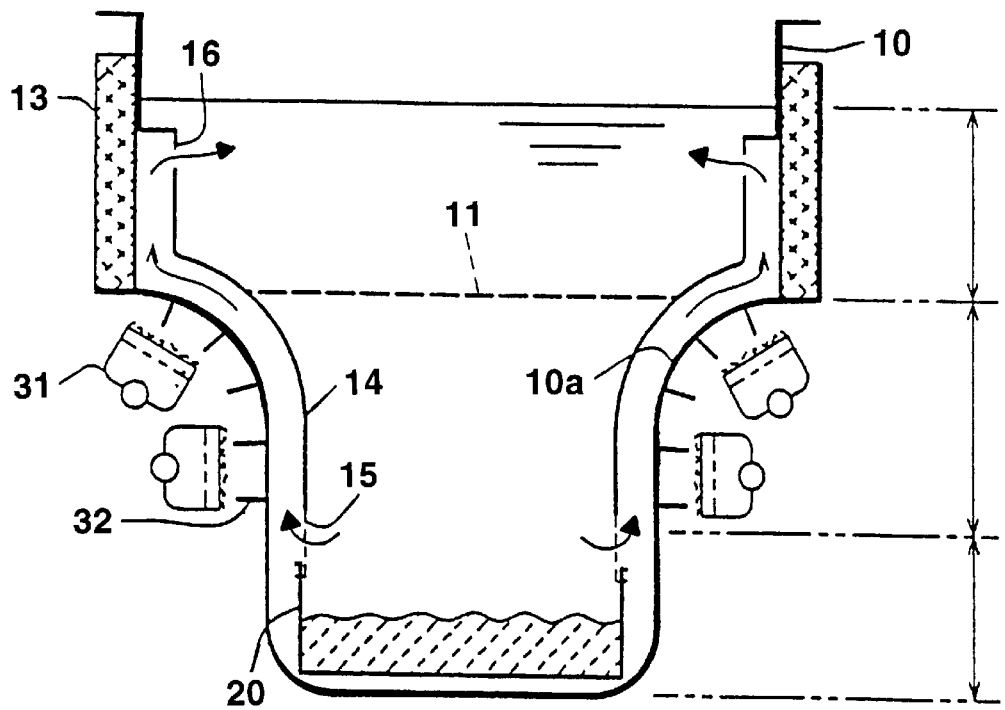
FIG. 2 is a cross sectional view of an oil tank portion of the fryer.
Figure 5:
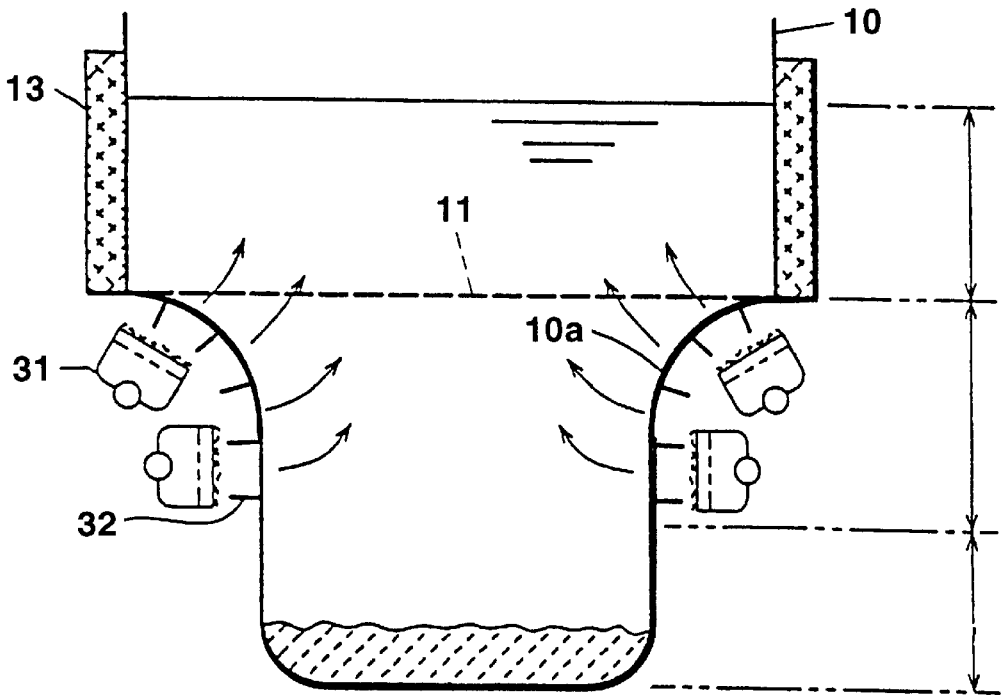
FIG. 5 is a cross sectional view of the oil tank portion of the fryer of the prior art.

As shown in FIG. 2, the oil tank 10 includes an inclined surface 10a on both the left and right side surfaces thereof. The inclined surface 10a is inclined toward a bottom and its outer wall is heated by the burner 31. A net for placing a basket (not shown) containing food is disposed over the inclined surface 10a. Thereby, a cooking zone for frying is provided in an upper portion of the oil tank 10. A section under a lower end of a heating section functions as a cold zone for storing fry residues falling away from the food. An intermediate zone is also provided between the cooking zone and the cold zone.

A temperature sensor 12 for detecting a temperature of the oil is disposed on the side surface of the oil tank 10 in the cooking zone. A heat insulation material 13 is laminated to the outer wall of the oil tank 10 in the cooking zone.

Figure 3:
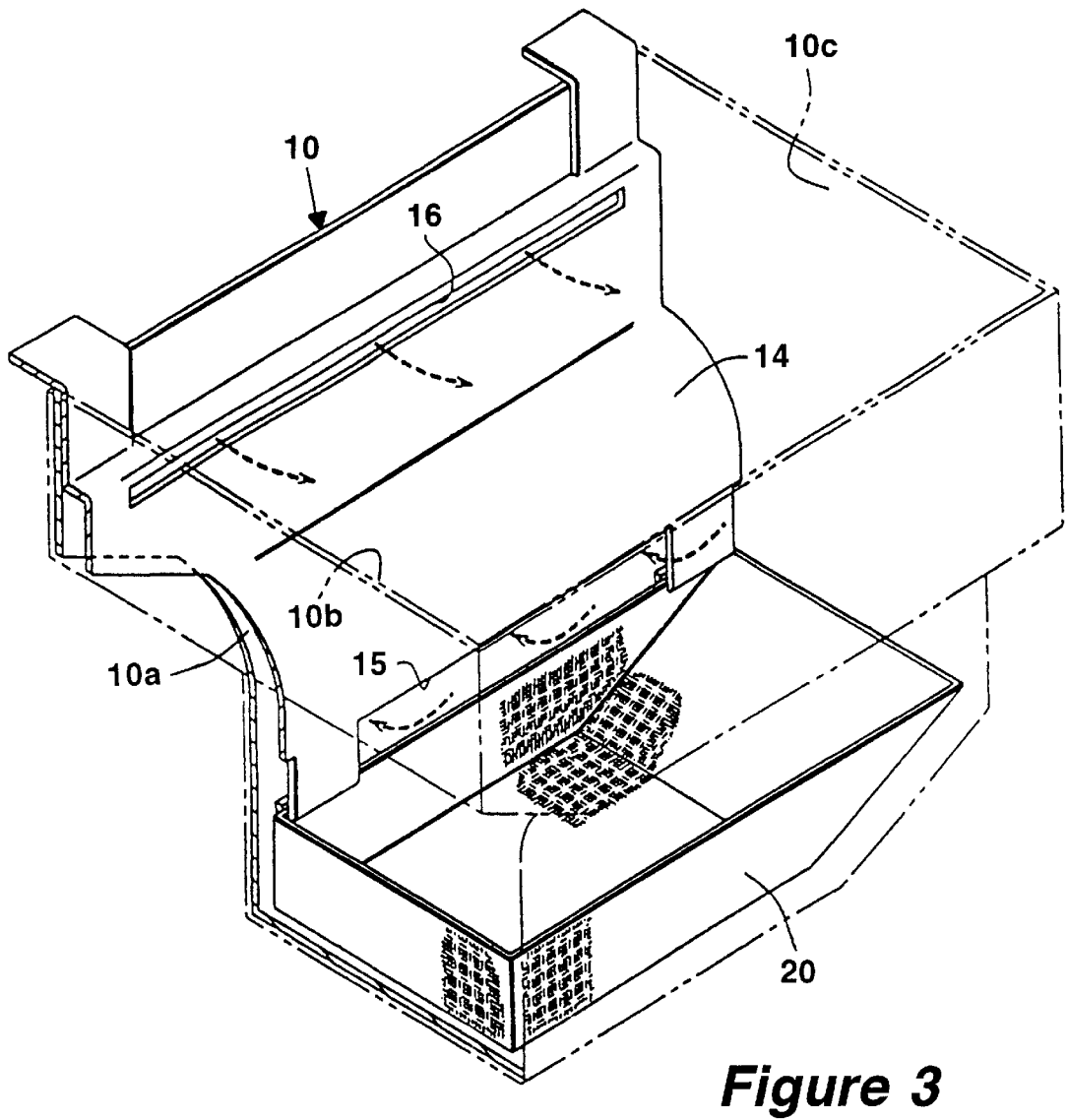
FIG. 3 is an illustration of a guide plate.

Several fins 32 are welded to the outer wall of the inclined surface 10a of the oil tank 10 forward and backward. The fins 32 efficiently transfer a heat of combustion of the burner 31 to the oil in the oil tank 10. A guide plate 14 for guiding the oil along the inclined surface 10a is also disposed inside the inclined surface 10a. As shown in FIG. 3, the guide plate 14 defines an oil flow path along the inclined surface 10a by the use of the inclined surface 10a and front and rear side surfaces 10b, 10c of the oil tank 10. The guide plate 14 has an inlet port 15 on the lower end thereof facing the cold zone. The guide plate 14 has an outlet port 16 in the upper portion thereof facing the cooking zone. The guide plate 14 guides the oil heated on the inclined surface 10a from the outlet port 16 directly to the cooking zone and guides the oil in a lower portion of the oil tank 10 from the inlet port 15 to the inclined surface 10a. The outlet port 16 is a hole formed in a vertical surface of the guide plate 14. An upper surface is closed, whereby the fry residues are difficult to enter from the upper portion. The guide plate 14 is detachably suspended on an upper end of the oil tank 10.

A receiving box 20 for storing the fry residues falling away from the food is included in the cold zone. The upper end of the left and right side surfaces of this receiving box 20 is coupled to the lower end of the guide plate 14, so that the receiving box 20 is integrated with the guide plate 14. The guide plate 14 is lifted upward, whereby the receiving box 20 can be removed so as to remove the stored fry residues and the guide plate 14 and an inner wall of the oil tank 10 are easily cleaned. The receiving box 20 is made of a wire netting with a fine mesh. When the receiving box 20 is pulled up, the fry residues in the receiving box 20 are difficult to disperse in the oil because the oil passes through the mesh. There is no need for a troublesome filtration of the oil after the receiving box 20 is pulled up.

The receiving box 20 is not limited to the wire netting. For example, the receiving box 20 may be made of a plate having a plurality of small holes or slits.

The heating station 30 comprises the burner 31 for directly heating the outer wall of the inclined surface 10a of the oil tank 10; a gas supply path 40 for supplying fuel gas to the burner 31; an air supply path 50 for supplying the air to an exhaust gas flow path; and a controller 60 for controlling the oil temperature or the like.

The burner 31 is an all primary air burner for providing a totally primary combustion on the surface of a ceramic plate having many burner ports. Two upper and lower burners are arranged along the outer wall of the inclined surface 10a.

The gas supply path 40 comprises a gas solenoid valve 41 for opening or closing a gas flow path to the burner 31; and a nozzle 42 for jetting the fuel gas to the burner 31. The fuel gas is jetted to the burner 31 from the nozzle 42, whereby the primary combustion air is sucked from a clearance between the nozzle 42 and the burner 31. The exhaust gas generated in the burner 31 flows behind the left and right side surfaces of the oil tank 10 to an exhaust pipe 43.

The air supply path 50 comprises an air supply pipe 51 opened to the lower portion of the oil tank 10; an air exhausting pipe 52 opened to the exhaust pipe 43; and a fan 53 for allowing the air to flow from the air supply pipe 51 to the air exhausting pipe 52. The air taken in by the fan 53 is allowed to flow out to the exhaust pipe 43. This constitution promotes the exhaust flow and also prevents overheating by cooling the exhaust pipe 43. Moreover, the air supplied to the air supply pipe 51 and the burner 31 is taken in from air supply holes 70a opened in a front surface of the casing 70.

The controller 60 performs on-off control for switching the burner 31 between the combustion and the combustion stop by opening or closing the gas solenoid valve 41 so that the temperature of the oil in the cooking zone may be maintained in a predetermined range in accordance with the temperature detected by the temperature sensor 12.

Next, the operation of the fryer of this embodiment will be described. When the inclined surface 10a of the oil tank 10 is heated by the burner 31, the oil temperature rises near the inclined surface 10a. Then, all the heated high-temperature oil flows out from the outlet port 16 in the upper portion of the guide plate 14 directly to the cooking zone. Thus, the oil temperature is rapidly raised in the cooking zone. The oil temperature in the intermediate zone under the cooking zone is more difficult to rise than that in the cooking zone. The deterioration of the oil can be therefore suppressed.

Meanwhile, the fry residues of the food fall from the basket (not shown) and the net 11 during the cooking. However, since the inclined surface 10a is covered with the guide plate 14, the fry residues do not fall directly on the inclined surface 10a. Moreover, the oil near the inclined surface 10a smoothly flows from the inlet port 15 to the outlet port 16. Even if the fine fry residues do not sink and thus float in the oil, they are difficult to adhere to the inclined surface 10a. Accordingly, the fry residues are guided to the receiving box 20 in the deepest portion of the cold zone by the guide plate 14. This prevents the carbonization and storage of the fry residues caused due to the adhesion of the fry residues to the high-temperature inclined surface 10a. Thus, a thermal conduction from the inclined surface 10a to the oil can be kept well. Moreover, the fry residues in the receiving box 20 are difficult to carbonize because they are stored in the low-temperature oil. The deterioration of the oil can be therefore suppressed.

A cycle of fry residue removal is shorter than a cycle of oil replacement. Heretofore, the oil has been once let out of the oil tank and filtered in order to remove the stored fry residues, and then the oil has been again poured into the oil tank by a pump or the like. However, in this embodiment, even if the oil tank 10 is filled with the oil, the stored fry residues can be easily removed by removing the receiving box 20. Thus, there is no need for an arrangement such as a filtering unit for removing the fry residues in the oil and a circulating unit for again feeding the filtered oil into the oil tank by the pump. A low-cost device is obtained. Moreover, since the removing operation can be carried out for a short time, it can be easily performed during working hours, for example.

As described above, according to the fryer of this embodiment, all the oil heated to the high temperature is allowed to flow out directly to the cooking zone so as to intensively increase the temperature of the oil in the cooking zone associated with the cooking of the food. It is thus possible to improve a start-up performance of raising the oil temperature to the suitable temperature from the start of the operation and a recovery performance of recovering the oil temperature to the suitable temperature after the introduction of the food.

Moreover, the oil heated to the high temperature is caused to flow out directly to the cooking zone so as to thereby permit a less rise in the temperature of the oil in the intermediate zone not associated with the cooking. Thus, the deterioration of the oil can be suppressed. Furthermore, the temperature of the oil in the cooking zone is intensively raised, whereby a waste of energy can be suppressed.

Additionally, the receiving box 20 is removably arranged, whereby the stored fry residues can be removed without letting the oil out of the oil tank 10. Thus, the operation for removing the fry residues can be carried out for a short time. Moreover, there is no need for the oil filtering unit for filtering off the fry residues in the oil, the circulating unit for returning the filtered oil into the oil tank, or the like. Thus, the cost of the device can be reduced. Moreover, since the guide plate 14 can be removed from the oil tank 10, the guide plate 14 itself and the inner wall of the oil tank 10 can be easily cleaned. Furthermore, the receiving box 20 is integrated with the guide plate 14, whereby a common structure for removing the receiving box 20 and the guide plate 14 can be used. Moreover, since the receiving box 20 and the guide plate 14 can be removed at a time, the time and labor required for the removal can be reduced.

In addition, the inclined surface 10*a* is covered with the guide plate 14, whereby the fry residues falling away from the food can be prevented from directly falling and adhering on/to the inclined surface 10*a*. Moreover, the oil near the inclined surface 10*a* smoothly flows. Thus, the fry residues floating in the oil can be also prevented from adhering to the inclined surface 10*a*. Therefore, the thermal conduction from the inclined surface 10*a* to the oil can be kept well. The reduction of thermal efficiency can be suppressed. Moreover, since the deterioration of the oil can be suppressed and thus a time period until the oil exchange can be extended, the fryer of the present invention is economical.

An element for heating the oil tank 10 is not limited to the all primary air burner 31. For example, a Bunsen burner or an electric heater may be used.

Moreover, the shape of the guide plate 14 is not limited to the shape described in this embodiment. In short, any shape will do as long as the heated high-temperature oil is guided to the position facing the cooking zone.

Figure 4:
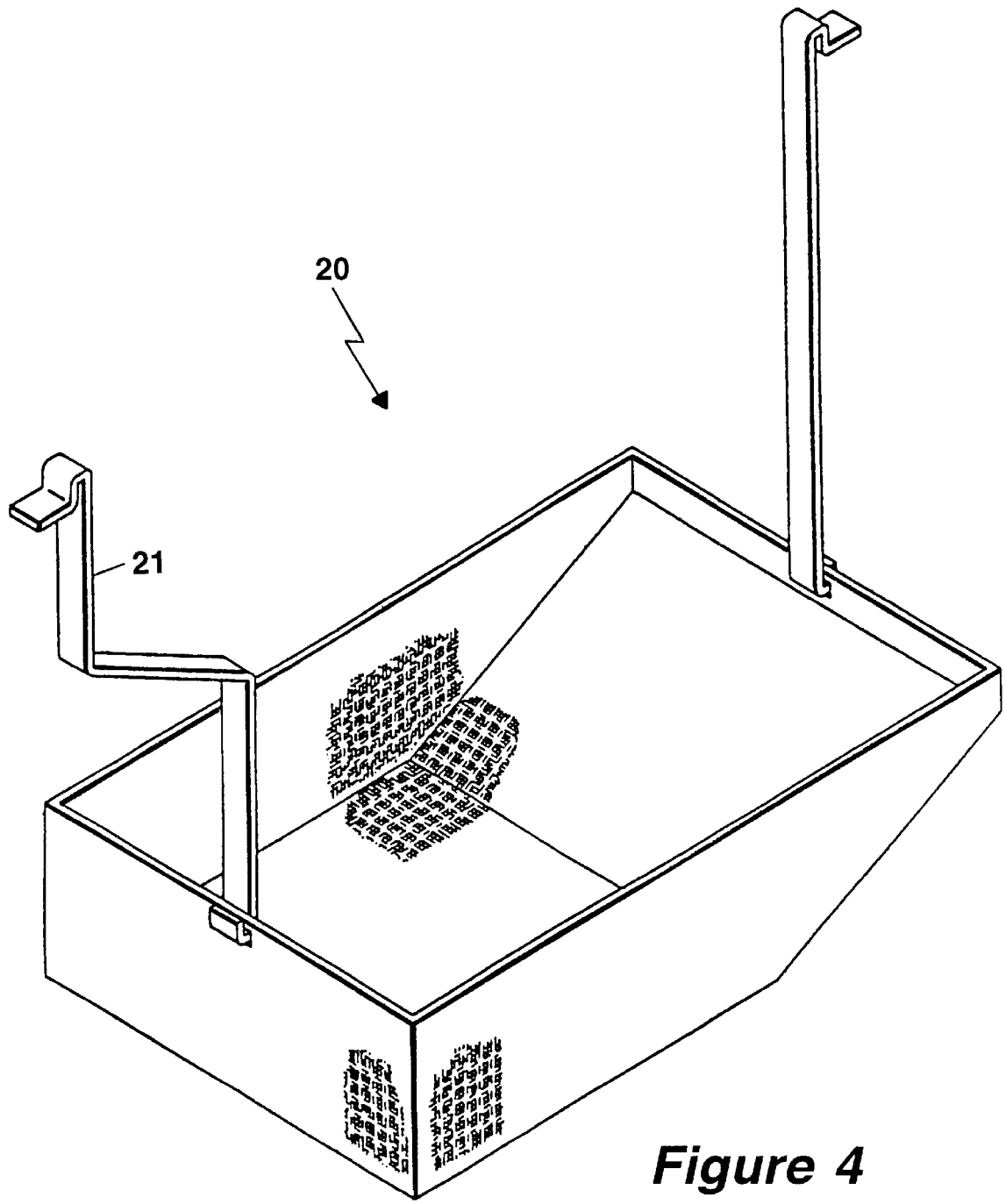
FIG. 4 is an illustration of a receiving box of another example.

In this embodiment, the receiving box 20 is integrally coupled to the guide plate 14, and the guide plate 14 is pulled up so as to thereby take out the receiving box 20. However, the present invention is not limited to this example. For example, as shown in FIG. 4, the receiving box 20 may include a suspension arm 21 for suspending the receiving box 20 from the upper end of the oil tank 10 so that the receiving box 20 alone can be independently taken out.

Although the embodiment of the present invention has been described above, the present invention is not limited to this embodiment and can be, of course, carried out in various modes within the scope of the present invention.

As described in detail above, according to the fryer of claim 1 of the present invention, the cooking oil heated to the high temperature is guided directly to the cooking zone so as to intensively raise the temperature of the cooking oil in the cooking zone associated with the cooking of the food. It is thus possible to improve the start-up performance of raising the cooking oil temperature to the suitable temperature from the start of the operation and the recovery performance of recovering the cooking oil temperature to the suitable temperature after the introduction of the food. Moreover, a less rise in the temperature of the cooking oil is enabled in the zone not associated with the cooking under the cooking zone. Thus, the deterioration of the cooking oil can be suppressed. Furthermore, the temperature of the cooking oil in the cooking zone is intensively raised, whereby the waste of energy can be suppressed.

Furthermore, according to the fryer of claim 2 of the present invention, the fry residues can be removed without letting the cooking oil out of the oil tank. Thus, the operation for removing the fry residues can be carried out for a short time. Moreover, there is no need for the filtering unit for filtering off the fry residues in the cooking oil, the circulating unit for returning the filtered cooking oil into the oil tank, or the like. Thus, the cost of the device can be reduced.

Furthermore, according to the fryer of claim 3 of the present invention, the guide plate can be removed from the oil tank, and thus the guide plate itself and the inner wall of the oil tank can be easily cleaned. Moreover, the receiving box is integrated with the guide plate, whereby a common structure for removing the receiving box and the guide plate from the oil tank can be used. Additionally, since the receiving box and the guide plate can be removed at a time, the time and labor required for the removal can be reduced.

What is claimed is:

1. A fryer comprising:

an oil tank having an inclined surface inclined downward toward the deepest portion, said oil tank being filled with cooking oil; and heating means for heating said inclined surface from the outside of said oil tank, said fryer for supporting and frying food in a cooking zone over said inclined surface in said oil tank, wherein said oil tank includes a guide plate for guiding the cooking oil heated on said inclined surface directly to said cooking zone and guiding the cooking oil in a lower portion of said oil tank to said inclined surface, along said inclined surface.

2. The fryer according to claim 1, wherein a receiving box for storing fry residues falling from the food is included in the lower portion of said oil tank, and said receiving box is attachable and removable to/from said oil tank.

3. The fryer according to claim 2, wherein said guide plate is attachable and removable to/from said oil tank, and said receiving box is integrated with said guide plate.

* * * * *